Patented May 8, 1951

2,551,926

UNITED STATES PATENT OFFICE 2,551,926

PREPARATION OF CYCLOALKYL ETHERS

Thomas P. Carney, Indianapolis, Ind., assignor to Eli Lilly and Company, Indianapolis, Ind., a corporation of Indiana No Drawing. Application September 25, 1947, Serial No. 776,145

7 Claims. (Cl. 260—473)

This invention relates to cycloalkyl ethers and is directed to a process of preparing cyclopentyl and cyclohexyl ethers of p-hydroxybenzoic acid and esters thereof.

The cycloalkyl ethers prepared in accordance with this invention may be represented by the formula

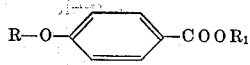

wherein R represents a cyclopentyl or cyclohexyl radical and $R_1$ represents hydrogen or an esterifying radical. The compounds represented above have utility as intermediates in the synthesis of local anesthetic compounds.

The method commonly employed for the preparation of ethers requires as one of the starting materials a cycloalkyl halide and comprises reacting the halide with a p-hydroxybenzoic acid ester in the presence of an alkali such as sodium methoxide. While this method may be satisfactory for preparing the lower alkyl ethers, it is unsuitable for preparing large quantities of cycloalkyl ethers since the cycloalkyl halides are expensive and not readily available, and the prolonged heating required to cause the reaction of the cycloalkyl halide results in the formation of undesired, complex by-products which reduce the yield of the cycloalkyl ether and make its isolation in pure form tedious and difficult.

An object of the present invention is to provide a process of preparing cyclopentyl and cyclohexyl ethers of benzoic acid and esters thereof, in good yield. Another object is to provide a process which utilizes relatively inexpensive and readily available starting materials. Other objects will become apparent from the disclosure made herein.

In pursuance of the above and other objects, I have discovered that the cycloalkyl ethers represented by the formula given above readily may be prepared by subjecting a mixture of a cycloalkene, i. e., cyclopentene or cyclohexene, and a p-hydroxybenzoyl compound, i. e., p-hydroxybenzoic acid or one of its esters, to the action of a catalyst of a group consisting of boron trifluoride and concentrated sulfuric acid. The catalyst causes the condensation of the cycloalkene with the hydroxyl group of the p-hydroxybenzoyl compound, thus producing the desired cycloalkyl ether.

The following is illustrative of a preferred method of carrying out the process of my invention. The p-hydroxybenzoyl compound and a moderate excess of the cycloalkene are dissolved in a non-reactive organic solvent, and about one fourth to one half of an equivalent of boron trifluoride or sulfuric acid is added to the solution. The mixture is heated, desirably with agitation, until the cycloalkene has reacted with the hydroxyl group of the p-hydroxybenzoyl compound and the reaction is complete. The desired cycloalkyl ether formed during the reaction may then be isolated and purified in any convenient manner. Thus for example, when the solvent employed is water-immiscible, the cycloalkyl ether may be isolated by washing the cooled reaction mixture with water to remove the boron trifluoride or sulfuric acid, evaporating the organic solvent phase wherein the cycloalkyl ether is dissolved and purifying the cycloalkyl ether which remains as a residue. When the product is a cycloalkyl ether of a benzoic acid ester, any unreacted p-hydroxybenzoic acid ester is readily removed therefrom by extraction with aqueous alkali in which the hydroxy compound is soluble. When the product is an ether of p-hydroxybenzoic acid, fractional crystallization from glacial acetic acid readily yields the desired ether in pure form.

In my invention, I may use as a starting material either p-hydroxybenzoic acid or an ester of p-hydroxybenzoic acid. Many esters are suitable but because of their ready availability I prefer to use the alkyl esters wherein the esterifying radical is an alkyl radical having from 1 to 6 carbon atoms, for example, a methyl, ethyl, propyl, butyl, amyl or hexyl radical.

The amount of catalyst employed in the reaction is not critical. For maximum yields, the boron trifluoride or concentrated sulfuric acid is used in an amount equivalent to about one fourth to one half of the amount of benzoic acid or ester used. Smaller amounts unnecessarily prolong the reaction, and larger amounts tend to promote side reactions.

The temperatures at which the reaction may be carried out may be within a range of about 40° C. to about 125° C. The preferred temperature when concentrated sulfuric acid is employed, is about 90° C. and when boron trifluoride is used, about 50° C. When an inert solvent is employed, it is convenient to choose a solvent whose boiling point approximates the temperature at which the reaction is to be carried out so that the refluxing of the reaction mixture maintains both the desired heat regulation and agitation of the solution.

I have found that a cycloalkanol, i. e., cyclopentanol or cyclohexanol, may be used as a starting material when sulfuric acid is the catalyst. The acid dehydrates the cycloalkanol to yield in situ the cycloalkene which reacts with the p-hydroxybenzoyl compound and forms the cycloalkyl ether. When a cycloalkanol is used, sufficient sulfuric acid should be used to effect both dehydration and catalysis, and the temperature should be high enough to cause distillation from the solution of the water formed by the dehydration of the cycloalkanol.

The inert solvent which may be used in my invention is any solvent which will not take part in the reaction. I have found that solvents such as benzene, toluene and saturated hydrocarbons boiling above about 40° C. are quite satisfactory. Numerous other solvents will readily be apparent to one skilled in the art. If desired, one may dispense with the presence of the inert solvent, particularly so if an excess of the cycloalkene is employed. However, such practice involves a loss of valuable reactant and hence is not a preferred manner of carrying out my process.

Specific examples which further illustrate the process of my invention are as follows:

Example 1

80 g. of ethyl p-hydroxybenzoate and 81 g. of cyclohexene are dissolved in 500 ml. of benzene, and 15 g. of $BF_3$ are added over a period of 10 minutes. A slight spontaneous temperature rise occurs. Heat is then applied and the solution while stirred is maintained at 50–54° C. for about one half hour. The solution is then cooled and washed with water to remove the $BF_3$. The benzene layer containing the cyclohexyl ether is washed with 150 ml. of 15 per cent NaOH solution to remove unreacted ethyl-p-hydroxybenzoate, and is then washed with water to remove any alkali. The benzene is evaporated, leaving as a resdue ethyl p-cyclohexyloxybenzoate which is sufficiently pure for most purposes but which may, if desired, be further purified by fractional distillation.

The ethyl p-cyclohexyloxybenzoate may be converted to the corresponding acid as follows: The ethyl ester obtained as above is refluxed with about 200 ml. of 10 per cent sodium hydroxide for about one hour. The solution is then cooled and acidified with hydrochloric acid, whereupon p-cyclohexyloxybenzoic acid precipitates. It is separated by filtration and dried.

Dry cyclohexyloxybenzoic acid thus obtained from about 80 g. of ethyl p-hydroxybenzoate weighed about 74 g. A portion of the p-cyclohexyloxybenzoic acid was prepared in analytically pure state by recrystallizing it from glacial acetic acid. The purified acid melted at about 186–188° C. Analysis showed the presence of about 70.7 per cent carbon and about 7.3 per cent hydrogen, as compared with the calculated values of 70.9 per cent carbon and 7.3 per cent hydrogen.

Example 2

Example 1 is repeated except that in place of boron trifluoride, about 12 ml. of concentrated sulfuric acid are added. The reaction mixture is refluxed for about 2 hours. The ethyl p-cyclohexyloxybenzoate is recovered by the method described in Example 1. The yield of p-cyclohexyloxybenzoic acid obtained is slightly less than that obtained by the procedure described in Example 1.

Example 3

62 g. of ethyl p-hydroxybenzoate and 142 g. of cyclopentanol are dissolved in 150 ml. of benzene, and 21 ml. of concentrated sulfuric acid are added. The mixture is refluxed for 24 hours, during which time 41 ml. of water are removed by means of a Dean-Stark water trap. At the conclusion of the refluxing period the solution is extracted with 15 per cent sodium hydroxide solution to remove any unreacted ethyl p-hydroxybenzoate. The benzene is evaporated, the residue of ethyl p-cyclopentyloxybenzoate hydrolyzed and the p-cyclopentyloxybenzoic acid recovered by the procedure described in Example 1 for the corresponding cyclohexyl derivative.

The p-cyclopentyloxybenzoic acid when purified by recrystallization from glacial acetic acid melted at about 179–180° C. Analysis showed the presence of 69.74 percent carbon and 6.67 percent hydrogen, as compared with the calculated values of 69.88 percent carbon and 6.79 percent hydrogen. About 50 g. of purified p-cyclopentyloxybenzoic acid were obtained.

Example 4 p-Hydroxybenzoic acid was reacted with cyclopentene by substantially the same procedure as described in Example 1. The reaction mixture was washed with water and the benzene solution evaporated. The residue of p-cyclohexyloxybenzoic acid obtained by evaporating the benzene solution was purified by recrystallization from glacial acetic acid. It melted at about 179–180° C.

Example 5

The cyclopentyl and cyclohexyl ethers of other esters of p-hydroxybenzoic acid are prepared in the same manner as the cyclopentyl ether of ethyl p-hydroxybenzoate. By using equivalent amounts of materials, the directions disclosed in Examples 1, 2 and 3 are applicable to the preparation of the ethers of these esters.

I claim:

1. In the process of preparing cycloalkyl ethers of p-hydroxybenzoyl compounds by reacting a cycloalkene with a p-hydroxybenzoyl compound, the step which comprises treating a mixture of a cycloalkene of the group consisting of cyclopentene and cyclohexene and a p-hydroxybenzoyl compound of the class consisting of p-hydroxybenzoic acid and lower alkyl esters thereof with a catalyst of the class consisting of boron trifluoride and concentrated sulfuric acid at a temperature of from about 40° to about 125° C.

2. The process of preparing cycloalkyl ethers of p-hydroxybenzoyl compounds which comprises heating to a temperature of from about 40° to about 125° C. with a catalyst of the class of boron trifluoride and concentrated sulfuric acid, a solution in an inert solvent of a cycloalkene of the group consisting of cyclopentene and cyclohexene and a p-hydroxybenzoyl compound of the group consisting of p-hydroxybenzoic acid and lower alkyl esters thereof wherein the lower alkyl esterifying radical has from 1 to 6 carbon atoms, and isolating the cycloalkyl ether of the p-hydroxybenzoyl compound produced in the reaction.

3. The process of preparing cycloalkyl ethers of p-hydroxybenzoyl compounds which comprises dissolving in an inert solvent one equivalent of a p-hydroxybenzoyl compound of the group consisting of p-hydroxybenzoic acid and lower alkyl esters thereof wherein the alkyl esterifying radical has from 1 to 6 carbon atoms, and about 2 equivalents of a cycloalkene of the class consisting of cyclopentene and cyclohexene, adding about one half equivalent of a catalyst of the class consisting of boron trifluoride and concentrated sulfuric acid, and heating the mixture to a temperature of from about 40° to about 125° C., thereby causing the cycloalkene to react with the hydroxyl group of the p-hydroxybenzoyl compound, and isolating the cycloalkyl ether of the p-hydroxybenzoyl compound produced in the reaction.

4. A process according to claim 3 wherein the cycloalkene is cyclohexene.

5. A process according to claim 4 wherein the solvent is benzene.

6. The process of preparing ethyl p-cyclohexyloxybenzoate which comprises preparing in an inert solvent a solution of cyclohexene and ethyl p-hydroxybenzoate, adding to the solution boron trifluoride, and heating the solution to a temperature of from about 40° C. to about 125° C., thereby causing the cyclohexene to react with the hydroxyl group of the ethyl p-hydroxybenzoate, and isolating the ethyl p-cyclohexyloxybenzoate formed in the reaction.

7. In the process of preparing ethyl p-cyclohexyloxybenzoate by reacting cyclohexene with ethyl p-hydroxybenzoate, the step which comprises reacting a mixture of cyclohexene and ethyl p-hydroxybenzoate in the presence of boron trifluoride and at a temperature of from about 40° to about 125° C.

THOMAS P. CARNEY.

REFERENCES CITED

The following references are of record in the file of this patent:

UNITED STATES PATENTS

| Number | Name | Date |
|---|---|---|
| 2,070,848 | Semon et al. | Feb. 16, 1937 |
| 2,128,901 | Bass et al. | Sept. 6, 1938 |
| 2,128,975 | Duzee et al. | Sept. 6, 1938 |
| 2,439,818 | McElvain et al. | Apr. 20, 1948 |

OTHER REFERENCES

Shrauth et al.: Ber. Deut. Chem., vol. 57, p. 856 (1924).

Tronow et al.: Ber. Deut. Chem., vol. 62, p. 2846 (1929).

Sowa et al.: J. A. C. S., vol. 54, pp. 3694–3698 (1932).

Lefebre et al.: Comptes Rendus, vol. 221, pp. 301–303 (1945).

Lefebre et al.: Comptes Rendus, vol. 220, pages 782–784 (1945).

McElvain et al.: J. Am. Chem. Soc., vol. 68, pp. 259–260 (1946).